Figure 4:
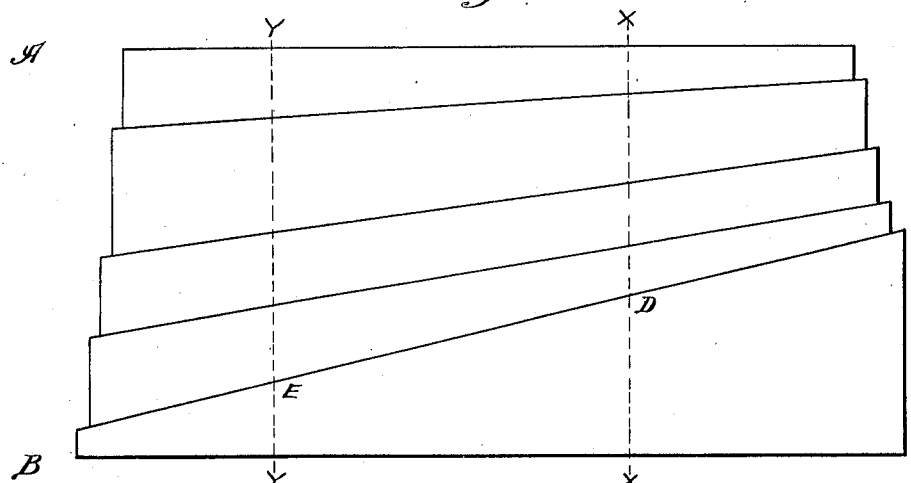

W. NOBLE.
MECHANISM FOR REGULATING THE CHARGING RATE OF STORAGE BATTERIES.
APPLICATION FILED NOV. 23, 1911.
1,157,028.
Patented Oct. 19, 1915.
2 SHEETS—SHEET 1.
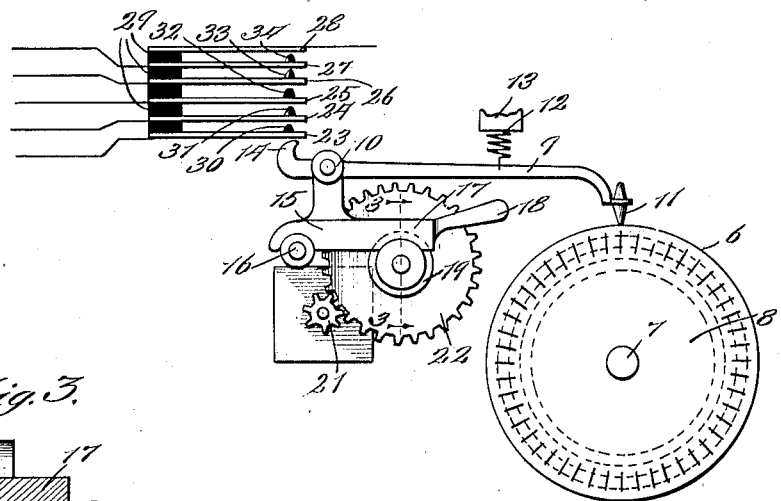
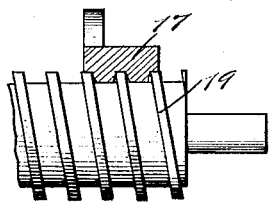
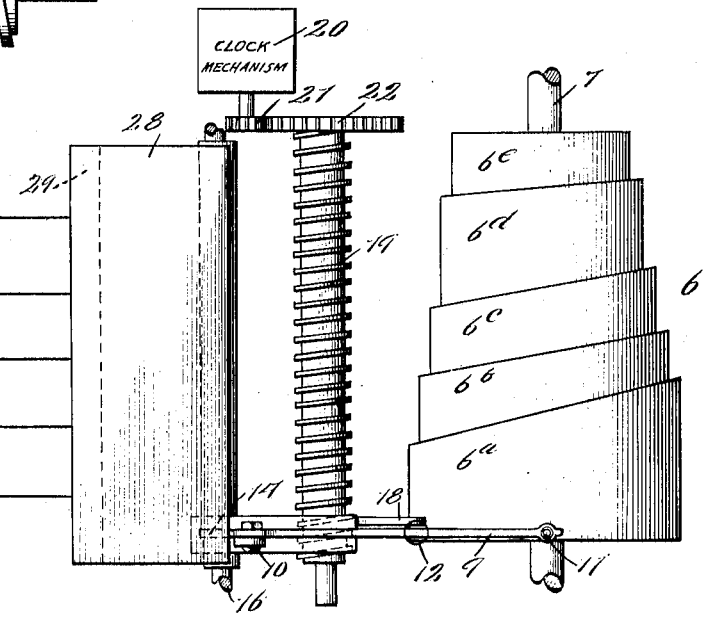
Witnesses:
Inventor:
Warren Noble W. NOBLE.
MECHANISM FOR REGULATING THE CHARGING RATE OF STORAGE BATTERIES.
APPLICATION FILED NOV. 23, 1911.

1,157,028.

Patented Oct. 19, 1915.
2 SHEETS—SHEET 2.

UNITED STATES PATENT OFFICE.

WARREN NOBLE, OF ORCHARD LAKE, MICHIGAN, ASSIGNOR TO SANGAMO ELECTRIC COMPANY, OF SPRINGFIELD, ILLINOIS, A CORPORATION OF ILLINOIS.

MECHANISM FOR REGULATING THE CHARGING RATE OF STORAGE BATTERIES.

1,157,028.  Specification of Letters Patent.  Patented Oct. 19, 1915.

Application filed November 23, 1911. Serial No. 662,046.

*To all whom it may concern:*

Be it known that I, WARREN NOBLE, a subject of the King of Great Britain, residing at Orchard Lake, in the county of Oakland and State of Michigan, have invented certain new and useful Improvements in Mechanisms for Regulating the Charging Rate of Storage Batteries, of which the following is a specification, reference being had to the accompanying drawings.

My invention relates to mechanism for properly charging storage batteries, and especially to mechanism by which the charging rate may be varied as the charge progresses, in accordance with the character and nature of the battery which is being charged.

In some types of storage batteries the nature of the battery is such that the charging rate requires to be diminished as the charging progresses. In other types it is desirable to have the charging rate increased as the charge progresses. In batteries of the so-called "lead" type, in which properly prepared lead plates are immersed in a solution of sulfuric acid, it is necessary to gradually reduce the rate of flow of the charging current as the charge progresses in order to prevent undue heating and consequent disintegration of the plates. For instance, if the normal initial charging rate for a given battery is thirty amperes, the rise in the electromotive force of the battery as the charge progresses is not sufficient to cut the flow of the charging current down to a safe point after the battery has become partially charged. In consequence, if the normal initial charging rate of the current is continued, the temperature of the electrolyte rises to a very high point. It is necessary, therefore, gradually to reduce the flow of the charging current as the charging of the battery progresses. While, theoretically, the charging rate should be reduced a number of times during the process of charging such a lead battery, in practice three or four steps of reduction are sufficient to give goods results. This is usually called "tapering" the charge. On the other hand, in certain forms of storage batteries, and particularly in that form which has nickel and iron elements, it is found that the internal resistance of the cells materially increases as the charge progresses, so that it is desirable to increase the charging rate rather than decrease it so that the battery may be charged at a continuous high rate. It will be obvious that if the internal resistance increases and if the voltage of the current by which the battery is sought to be charged remains the same during such rising internal resistance, the effective charging rate of the current to the battery is cut down; that is to say, the voltage remaining the same, the rate at which the battery is effectively charged diminishes with the increasing internal resistance, and it therefore follows that with some batteries of this type they cannot be completely charged unless some effective and desirable mechanism is provided by which the voltage of the charging current can be gradually increased so as to counteract the effect of rising internal resistance. It therefore becomes desirable in such cases to gradually increase the charging rate so as to counteract the effect of rising internal resistance.

It is the object of my invention to produce a new and improved apparatus, which, as the charging progresses, will automatically act to vary the charging rate by either cutting in or cutting out resistance in the circuit or varying the resistance of the circuit as the battery is being charged, and which will also properly take into account the initial condition of the battery with respect to charge when the recharging is begun. For instance, if the battery is recharged when only, say, half discharged, the same charging rate cannot effectively be maintained for as long a time as it could be maintained if the battery were fully discharged before the beginning of recharging.

My apparatus, therefore, has for its object to provide an apparatus which will not only automatically vary the charging rate, either increasing it or decreasing it in accordance with the character of the battery to be charged, but which also may be set at a desired point, in accordance with the condition of the battery with respect to its charge when the recharging is begun.

Figure 5:
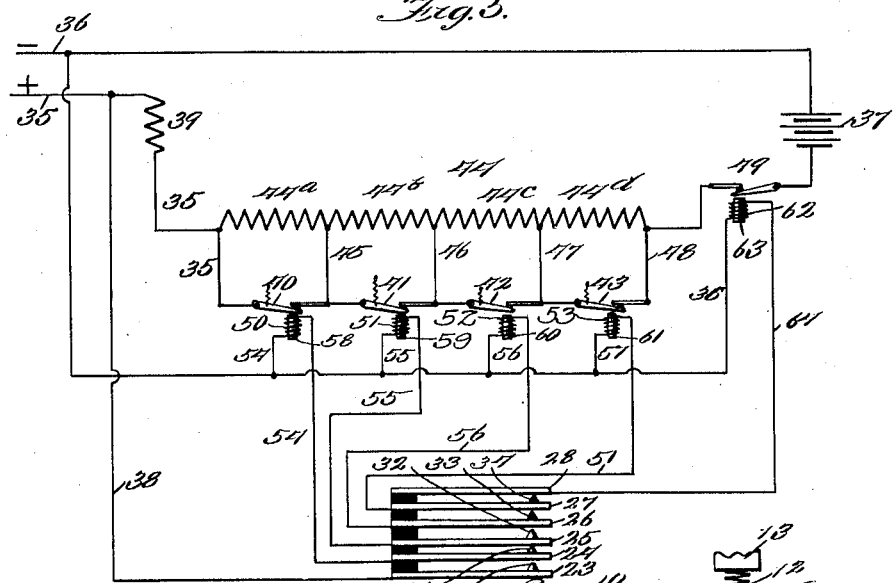
Figure 6:
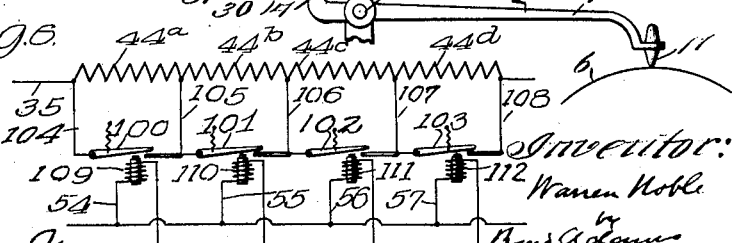

In the drawings,—Figure 1 is an end elevation; Fig. 2 is a top or plan view; Fig. 3 is an enlarged detail, being a portion of the actuating screw and the half nut driven thereby shown partially in section; Fig. 4 is a diagrammatic view of the drum developed; Fig. 5 is a diagrammatic view showing portions of my mechanism and the electric circuit connected therewith; and Fig. 6 is a diagrammatic view showing the form of switches to be used when it is desired to increase the charging rate.

Referring to the drawings,—6 indicates a drum, which is mounted upon a shaft 7 carried in suitable bearings (not shown) so that it may be rotated in said bearings as hereinafter set forth.

8 indicates a dial, which is suitably secured either to the end of the drum or upon the shaft 7 and whose surface is divided into a scale with divisions adapted to read either in ampere hours or in units of specific gravity, as may be desired. The dial is so secured to the drum that they turn together. As is best shown in Fig. 2 and in the development diagram in Fig. 4, this drum which constitutes a controller by which the variation of the resistance in the circuit is governed, is divided into a series of surfaces $6^a$—$6^b$—$6^c$—$6^d$—$6^e$ of progressively less diameter from one end of the drum to the other. These surfaces, therefore, form a suitable series of steps which, preferably, may be five in number, as is shown, but may, of course, be of less number. The end of each surface is formed in a curve, as is best shown in Fig. 2 and in the development thereof in Fig. 4, so that the first step gradually widens from one side to the other. The other steps also gradually widen, in, however, a reverse direction, as is best shown in said figures. These curves on which the steps are laid off are in each case based upon actual tests of the peculiar type of battery with which it is to be used, and the width of any successive step in a direction longitudinal of the drum is based upon the length of time during which a charge should continue at a given rate for the initial value of ampere hours discharged or the specific gravity of the battery when the drum is turned into such angular position as to bring the roller hereinafter described along that particular longitudinal line of the drum. These steps, therefore, will depend upon the type of battery which it is sought to charge and are readily ascertainable by actual tests of the battery in question, and the drum is laid off in accordance therewith. 9 indicates an arm pivoted near one end upon a suitable support, as 10, which is carried upon a carriage hereinafter described.

11 indicates a roller or cursor, which is carried upon the long arm of the lever 9 and is adapted to bear upon the successive surfaces of the drum 6.

12 indicates a compression spring, which bears between any suitable portion of the framework, as 13, and the lever 9 so as to hold the roller or cursor 11 in constant yielding contact with the surface of the drum 6. The other end of the arm is preferably bent upward into a hook, as 14, for bearing upon the contact plates hereinafter described.

15 indicates a carriage carrying the arm 10 and adapted to turn upon and slide along a suitable rod, as 16, which is mounted in any suitable framework or casing (not shown). The carriage 15 is provided with an arm 17 and a handle 18 which projects over a screw 19. The lower surface of the arm 17, near its end, is provided with an arc-shaped curve which is provided with screw-threads, as is best shown in Fig. 3, adapted to engage the threads of the screw 19, whereby, by rotation of the screw 19, the carriage is moved longitudinally along the rod 16 carrying the arm 9 and the roller 11 longitudinally along the drum 6. The screw 19 is continuously driven by any suitable motor, as 20, connected by suitable gears, as 21 and 22, to the screw 19 so that said screw is constantly driven during the charge of the battery at a suitable rate of speed.

The motor 20 may be of any approved type. It may be either an electrically-operated motor or clock-driven mechanism, or any other form of device which will give the desired rotation of the screw 19, and is diagrammatically illustrated, as it forms of itself no part of my invention. 23—24—25—26—27—28 indicate contact plates, which are suitably mounted in the framework and are insulated from one another by suitable insulating blocks, as 29, along one edge. Each of the contact plates 23—24—25—26—27 is provided with a contact point 30—31—32—33—34, respectively, of such a height that a very slight movement of each plate will bring it in electrical contact with the plate immediately above it. The contact plates are formed of suitable spring metal and are very thin so that they may be readily moved by the lever arm, as hereinafter described.

Referring to Fig. 5, 35—36 indicate wires of an electrical circuit coming from any suitable generator. 37 indicates diagrammatically the storage battery which is to be charged. 38 indicates a wire, which leads from the lowest contact plate 30 to the wire 35 and is connected therewith at a suitable point. 39 indicates a resistance in the wire 35 (shown, in this case, as the positive wire). 40—41—42—43 indicates switches, which are normally held closed by any suitable means, as springs (not shown), and which are interposed in the path of the circuit wire 35. 44 indicates a resistance coil, which is connected with each of the switches 40—41—42—43 by wires 45—46—47—48, whereby either the entire resistance 44 or a desired aliquot portion thereof may be interposed in the path of the circuit 35, as is hereinafter described. 49 indicates a switch, which is interposed between the resistance 44 and the storage battery 37. 50—51—52—53 indicate coils, which, by means of wires 54—55—56—57, are connected with the wire 35 and these coils are also connected with the plates 24—25—26—27, respectively. Each of these coils contains a core 58—59—60—61, respectively, which is magnetized when a current passes through the coil. These cores are placed in operative relation, respectively, with the switches 40—41—42—43, whereby, when the cores are energized, the respective switches are successively opened, as hereinafter described. 62 indicates a coil having a core 63 in operative relation with the switch 49 and connected with the circuit 36 and by a wire 64 with the plate 28. It will be obvious from the above description, that as long as the plate 28 is not in contact with the plate next below it, 24, the current from the generator will flow through the resistance 39 and the resistance 44 and the circuit composed of the wires 35 and the switches 40—41—42—43, wire 48, switch 49, to the battery 37, and that the current, dividing itself according to well-known principles, will be divided between the resistance 44 and the metallic circuit formed by the wires and the switches above named, and as the resistance of the coil 44 is very great as compared with the resistance in the other branch of the circuit, the principal amount of the current will flow directly through the battery 37 and back by the wire 36 to the generator. This is the position of the parts when the roller or cursor rests upon the larger portion 6$^a$ of the drum 6. As the screw rotates, the cursor is moved longitudinally along the drum, causing the roller to drop successively to each of the surfaces 6$^b$—6$^c$—6$^d$ of the drum, thus bringing the contact plate 23 first into connection with contact 24 and then connecting together successively the several contacts 23—24—25—26—27, operating successively the switches 40—41—42—43 and gradually thus throwing successively greater portions of the resistance 44 into the circuit, as will be hereinafter more fully described. When the battery is charged, the drum is so arranged that the cursor or roller drops into the portion 6$^e$, thus energizing the coil 62, opening the switch 49, and throwing the storage battery out of the circuit.

The above-described apparatus describes my invention when used in charging a battery in which it is desired to gradually diminish the charging rate as the charge progresses. Fig. 6 shows another form of my device which is used when it is desired to increase the charging rate. In this figure the parts quite generally resemble the parts shown in corresponding portion of Fig. 5 and described above. They differ, however, mainly in that the switches are so arranged and the operating devices so placed and operated with relation to them that the switches are normally open so that the current from the battery normally passes through the entire resistance, and that as the bearing device traveling along the drum 6 successively closes the contacts between the parts 23 to 28 the switches are closed successively, cutting out more or less of the resistance so as to gradually increase the current supplied to the battery. Referring, therefore, particularly to Fig. 6, 44$^a$—44$^b$—44$^c$ and 44$^d$ indicate resistances precisely like the resistances indicated above in Fig. 5 and described by corresponding numbers. 100—101—102—103 indicate switches which are arranged in series and connected by suitable wires, as 104—105—106—107—108 with the resistances 44$^a$—44$^b$—44$^c$—44$^d$. The switches 100 to 103 are normally open so that when they are in their normal position the entire current passes through the resistances 44$^a$ to 44$^d$, inclusive, and thus the entire resistance is in series with the storage battery which is sought to be charged. 109—110—111—112 indicate magnets which by means of wires are connected, respectively, with the bars 24—25—26—27 shown in Fig. 5 in exactly the same manner and by the same wire as in the devices shown in the other figures, and also with the circuit wire 38 shown in Fig. 5 and in exactly the same manner. The effect of energizing each of these magnets is to close the corresponding switch so as to cut off a definite portion of the resistance. For instance, as the bearing device travels off the first step of the hub the electrical circuits between bars 23 and 24 are closed by the contact 30, the current energizing magnet 109 closing switch 100, and thereby cutting out a portion of the resistance 44$^a$, which, of course correspondingly increases the voltage of the circuit to the storage battery. In precisely the same manner as described above, and which it is believed it is not necessary to repeat here, the farther travel of the bearing device along the hub successively energizes magnets 110—111—112, closing successively the corresponding switches 101—102—103, gradually successively cutting out portions of the resistances 44$^b$—44$^c$—44$^d$ and gradually increasing the voltage of the current to the battery. It thus follows, of course, that as the coils 109 to 112 are successively energized the different switches are successively closed, the successive resistances cut out, and the voltage of the current through the circuit is progressively increased in amounts as the charging progresses. It will, of course, be understood that the other features of the device are the same when used with the switching mechanism shown in Fig. 6 as before described. For instance, the coil 62 shown in Fig. 5 is in this figure in the same position as before and operates in the same way so that when the bearing roller is upon the last step of the drum the coil 62 is energized, the switch 49 thrown open (see Fig. 5), and the battery is entirely cut off.

Described more in detail, the operation of my device in the charging of a battery, when it is desired to diminish the charging rate, is as follows: If the battery is connected with an ampere hour meter, the reading of the ampere hour meter is taken and the drum is turned so that the roller rests upon a point thereof on the large surface 6ª in a line with the corresponding mark upon the dial. If the battery is not provided with an ampere hour meter, a pilot cell of the battery is tested for specific gravity and the dial is turned to the proper position. In other words, in either case the dial 8 is turned into proper position for either the ampere hours or for the gravity noted, so that the roller will rest over the figure in the dial which corresponds with the ampere hours indicated in the meter or the gravity indicated by the pilot cell. As has been described above, this first step 6ª gradually widens from one end to the other. If, for example, the battery is shown to be wholly discharged, the drum will be so turned that the cursor will rest upon the widest portion of the step 6ª. If the battery is considerably less discharged, it will rest upon a narrower portion of the step 6ª,—the width of this step, as has been said, being determined by the type of battery in question.

Referring now particularly to the form of devices shown in Figs. 1 to 5, when the current is turned on from the generator through the circuits 35—36, it will pass through the metallic switches 40—41—42—43 and 49 into the battery, only a very small portion, of course, passing through the resistance coil 44. At the same time the driving mechanism being set into motion, the screw is rotated and the carriage bearing the lever begins to travel longitudinally of the drum toward the other end, the roller bearing upon the surface. As soon as the edge of the step is reached, the end of the arm carrying the roller will drop to the next step, 6ᵇ, causing the other end of the lever to rise and bringing the contact plates 23 and 24 into electrical connection by means of the contact point 30. A portion of the current, therefore, will flow through the wire 38, contact plates 23—24, wire 54, back to circuit wire 36, energizing the coil 54 and opening switch 40, which will thereupon cause the current to pass through the portion 44ª of the resistance 44 and thence, by means of wire 45, through the other switches 41—42—43—49 to the battery, thus interposing an aliquot portion 44ª of the resistance 44 into the circuit, and causing a less amount of current to flow through the battery as long as the roller rides upon the second step 6ᵇ. When the roller 11 in its movement longitudinally of the drum comes to the end of the portion 6ᵇ, it falls upon 6ᶜ, causing plates 24 and 25 to be thrown in contact, thus energizing, in the same way as above described, the coil 51, opening switch 41, and throwing an aliquot portion of the resistance 44ᵇ also into the circuit, thus further diminishing the flow of the current into the battery. Thus, without going further into detail, as the roller goes from step to step switches 42 and 43 are opened, finally throwing in for the last step of the charging the entire resistance 44. When the roller drops from the step 6ᵈ to the step 6ᵉ, the circuit is completed through the wire 38, charging plates 23—24—25—26—27—28 and wire 64, energizing coil 62, opening switch 49, and cutting off the battery from the generator.

From what has been said above, the operation of my devices when operated with the form shown in Fig. 6 will be clear, but it may be well to recapitulate it. The drum being rotated so as to be set at the desired point on the index, in accordance with the ascertained discharge of the battery or in accordance with the specific gravity, as above described, the apparatus is set running. The switches 100 to 103 are all open and the switch 49 closed, whereby the entire current from the main line flows through the resistances 44ª—44ᵇ—44ᶜ—44ᵈ into the battery. As the roller progresses along the drum longitudinally thereof, it falls down upon the second step. The contact between plates 23 and 24 is thereupon closed and coil 109 energized, closing switch 100, thus causing the current to flow around resistance 44ª, through wire 35 and switch 100, increasing, for the time being, the charging rates. When the roller falls upon the next step, contacts 24 and 25 are closed, the coil 110 is energized, the switch 101 is closed and the resistance 44ᵇ is cut out, the current flowing through switch 101 to wire 106. Thus, as the movement progresses, coils 111—112 are progressively energized, opening switches 102—103 and cutting out still more resistance. When the roller falls upon the last step, the coil 62 is energized, as before, opening switch 49 and breaking the charging circuit to the battery.

I have illustrated in the developed drum shown in diagrammatic Fig. 4, by means of two lines X—X and Y—Y, different positions of the roller as it travels along the plate. For instance, if the battery should be found to be considerably over half discharged, the roller will be set, for example, so that it will fall on line X—X, and traveling along that line, will continue at a maximum rate from X to D for a considerable period. If, on the other hand, the battery had been discharged only a smaller fraction of its capacity, the drum would be so turned that the roller would travel along the line, say, Y—Y, in which case the initial charge, at the high rate, would be continued during only the interval represented by Y—E. Thus, owing to the shape of the successive surfaces of the drum, where the initial charge is continued at a given rate for considerable time, as for a battery which has been almost entirely discharged, the other steps will continue for relatively shorter times. If, however, the initial charge is continued for a shorter time, owing to the battery having been less discharged before the recharging begins, the other steps will continue for relatively longer times, as is indicated by the width of the steps. It will thus be seen that the battery takes account not only of the time element, varying the charging rate at proper periods, and also of the nature of the battery according to the position of the steps on the drum, but also, by means of the adjustment of the drum at different positions preparatory to the charging, it takes account of the initial condition of the battery and modifies the successive rates in charging according to such position.

It will be understood, of course, that some suitable device is provided by which the switches at the beginning of a charging operation may be manually closed when it is desired to increase the charging rate or opened when it is desired to decrease the charging rate, according to the form in which my apparatus is used, but such device may be of any well-known character and is well understood, and forming no part of my present invention, I have not illustrated the same in order not to encumber the drawings and description with needless matter. It will be understood, of course, that the several parts are mounted in suitable supports and in suitable framework, which may be of any well-understood or preferred type and which form no part of my present invention. I have, therefore, not shown such framework and supports in full, as to do so would only unnecessarily encumber the drawings and description. It will also be understood that my invention is not limited to the forms of switches and circuit breakers shown, as any suitable form of electrically-operated switch may be used and the resistances may also be otherwise arranged without departing from the spirit of my invention.

I have shown the stepped device on which the roller or cursor travels as being in the form of a drum in which the steps are of progressively decreasing diameter, and that is the form in which I prefer to embody that portion of my device for obvious mechanical reasons. I have shown also the drum as revoluble, but stationary as far as longitudinal movement is concerned, and have given the lonitudinal movement to the roller. That also is the most convenient, mechanical form, and hence the preferable form, of my device. It is obvious, however, that other forms might be used instead of a drum and that the drum and roller might be otherwise relatively moved with reference to each other and still be within the spirit of my invention. I, therefore, do not confine myself to a drum except as specifically claimed or to have the roller itself move along a stationary drum except as specifically claimed, as it is obvious that some other form of a stepped device or platen could be used and some other way of giving the stepped device and the platen a relative movement longitudinally of the stepped device.

I have described my invention as a device for regulating the charging rate of storage batteries, and that is, of course, its primary purpose and object. It will be obvious, however, that it could be used for other specific purposes than for the one named, where it is desired to change the rate of flow of an electric current, and it can also be used for still other objects and purposes. Indeed it may be used in various forms for various purposes in which there is need of an apparatus for determining the performance of variable functions related to or depending upon a mathematically expressible quantity. I therefore do not confine myself to the specific use of my invention as described in the title thereof, except as specificaly claimed.

That which I claim as my invention and desire to secure by Letters Patent, is,—

1. In an apparatus for varying the resistance in an electric circuit, in combination, an electrical resistance, a platen having a physical contour varying in elevation longitudinally thereof, a bearing device adapted to bear upon said platen, mechanism for causing said bearing device to traverse the varying contour of said platen, and circuit making-and-breaking devices operated by the movement of said bearing device relative to the varying contour of said platen to vary the resistance in the circuit.

2. In an apparatus for varying the resistance in an electric circuit, in combination, an electrical resistance, a platen having a physical contour varying in elevation longitudinally thereof, a bearing device adapted to bear upon said platen, mechanism for causing said bearing device to traverse the varying contour of said platen, mechanism operated by the movement of said bearing device relative to the varying contour of said platen to vary the resistance in the circuit, and means for varying the intervals between successive variation of resistance.

3. An apparatus for varying the resistance in an electrical circuit, comprising a resistance, a member adapted to be actuated to include more or less resistance in the circuit during different intervals, and a controller controlling the actuation of said member, said controller and member being relatively adjustable to vary the length of certain of such intervals.

4. In combination, an electric circuit, a variable resistance, a stepped drum, a bearing device adapted to be yieldingly held in contact with the surface of said drum, means for giving to said bearing device a movement longitudinal of said drum, and means operated by said bearing device as it moves longitudinally of said drum to progressively vary said resistance.

5. In combination, an electric circuit, a resistance, a drum adapted to be rotated to set the same in any desired position and provided with a series of steps of progressively diminishing diameter, a lever adapted to yieldingly bear at one end upon the surface of said drum, means for causing said lever to move longitudinally of said drum, and means operated by the passing of said lever from step to step on said drum to progressively vary said resistance.

6. In combination, a main electric circuit, a resistance, a drum provided with a plurality of steps of progressively diminishing diameter from one end of said drum to the other, a lever adapted to yieldingly bear at one end on said drum, means for moving said lever longitudinally of said drum, a plurality of contact plates corresponding in number to the steps on said drum and adapted to be successively moved into contact with one another by one end of said lever as the other end passes from step to step on said drum, electrical circuits between each of said contact plates and said main circuit, and means operated by said circuits from said contact plates as they are successively brought into contact with one another to progressively vary the amount of said resistance as said lever passes from step to step on said drum.

7. In combination, a platen, a bearing device adapted to travel along said platen, means for giving said bearing device and said platen a longitudinal movement relative to each other, the surface of said platen being adapted by the relative movement of said bearing device therewith to move said bearing device into different positions, an electric circuit, and circuit making-and-breaking devices operated by said bearing device in its movement into different positions to vary the resistance in said circuit.

8. In combination, a drum adapted to be set in any desired position and having a surface adapted to vary the position of a bearing device traveling along the same, a bearing device yieldingly held in contact with the surface of said drum, means for giving said drum and said bearing device a relative movement longitudinally of said drum, an electric circuit, a resistance, and means operated by said bearing device in its movement into different positions to vary the said resistance in said circuit.

9. In combination, an electric circuit, a variable resistance, a member having a stepped surface, the margins of certain of said steps being inclined, a bearing device adapted to traverse said steps in contact with the surface of said member, means for moving said bearing device over said stepped surface, means for varying the line of travel of said bearing member over said steped surface, and means operated by said bearing device as it moves over said stepped surface to vary the amount of resistance in the circuit.

10. In combination, an electric circuit, a variable resistance, a rotatably mounted stepped drum, the margins of certain of the steps of the drum being inclined, a bearing device adapted to traverse the steps of said drum, means for moving said bearing device over the surface of the drum, and means operated by the movement of said bearing device from one step to another to vary the resistance in the circuit.

11. The combination of a platen having a physical contour varying in elevation longitudinally thereof, a bearing device adapted to bear upon said platen, mechanism for causing said bearing device to traverse the varying contour of said platen, and circuit making-and-breaking devices actuated by the movement of said bearing device from one elevation to another of said platen to vary the number of such circuit making-and-breaking devices in circuit.

12. An apparatus for varying the resistance on an electric circuit, comprising a resistance, a traveling member adapted to be actuated to include more or less resistance in the circuit during different intervals, a controller controlling the actuation of said member, and means whereby the length of certain of said intervals may be varied.

13. An apparatus for varying the resistance in an electric circuit, comprising a resistance, a traveling member adapted to be actuated to include more or less resistance in the circuit during different intervals, a rotatably mounted controller adapted to swing about an axis parallel with the line of movement of said member and having a series of steps arranged longitudinally of its axis, and means operated by the movement of said member into engagement with the different steps for varying the amount of resistance in the circuit.

14. An apparatus for varying the resistance in an electric circuit, comprising a resistance, a traveling member adapted to be actuated to include more or less resistance in the circuit during different intervals, a rotatably mounted controller adapted to swing about an axis parallel with the line of movement of said member and having a series of steps arranged longitudinally of its axis, certain of said steps having margins inclined with reference to the line of movement of said member, and means operated by the movement of said member into engagement with the different steps for varying the amount of resistance in the circuit.

15. The combination of a plurality of contact devices normally disconnected from each other and adapted to be moved successively into electrical contact with one another, a bearing member adapted to be actuated to move one or more of such contact devices successively into contact with the adjacent contact device, a controller for controlling the actuation of said bearing member, comprising a platen having a physical contour varying in elevation longitudinally thereof, said bearing member being adapted to bear upon said platen, and mechanism for causing said bearing member to traverse the varying contour of said platen to vary the number of said contact devices in circuit.

16. An apparatus for varying the resistance of an electrical circuit, comprising a resistance, a member adapted to be actuated to include more or less of such resistance in circuit during different intervals, and a rotatably-mounted controller controlling the actuation of said member, said member being movable longitudinally of said controller to vary the resistance in the circuit during different intervals, and said controller being adjustable transversely of the line of movement of said member to vary the length of certain of such intervals.

17. The combination of a plurality of contact devices normally disconnected from each other and adapted to be moved successively into electrical contact with one another, a bearing member adapted to be actuated to move one or more of such contact devices successively into contact with the adjacent contact device, a controller for controlling the actuation of said bearing member, comprising a platen having a physical contour varying in elevation longitudinally thereof, said bearing member being adapted to bear upon said platen, and mechanism for causing said bearing member to traverse the varying contour of said platen to vary the number of said contact devices in circuit, said controller and bearing member being relatively adjustable to vary the actuation of said contact devices by said bearing member.

WARREN NOBLE.

Witnesses:
ALEXANDER H. FUSS,
HARRY L. STANTON.